United States Patent [19]

Murata

[11] Patent Number: 4,457,075
[45] Date of Patent: Jul. 3, 1984

[54] METHOD AND AN APPARATUS FOR MEASURING WHEEL ALIGNMENT OF MOTOR VEHICLES

[75] Inventor: Yoichi Murata, Nagoya, Japan

[73] Assignee: Toyota Jidosha Kogyo Kabushiki Kaisha, Aichi, Japan

[21] Appl. No.: 328,253

[22] Filed: Dec. 7, 1981

[30] Foreign Application Priority Data

Dec. 15, 1980 [JP] Japan .................................. 55-175895
Apr. 2, 1981 [JP] Japan ............................. 56-46459[U]

[51] Int. Cl.³ ............................................. G01B 5/255
[52] U.S. Cl. .................................................. 33/203.15
[58] Field of Search ................ 33/203, 203.15, 203.18, 33/203.2, 174 E, 174 PA, 1 N

[56] References Cited

U.S. PATENT DOCUMENTS

| 1,791,803 | 2/1931 | Creagmile et al. | 33/203.15 X |
| 3,128,561 | 4/1964 | Payne | 33/174 E X |
| 3,738,012 | 6/1973 | Sherman | 33/174 E X |
| 3,793,736 | 2/1974 | Cuprini | 33/203.15 X |

FOREIGN PATENT DOCUMENTS

| 630173 | 5/1936 | Fed. Rep. of Germany | 33/174 E |
| 742408 | 12/1943 | Fed. Rep. of Germany | 33/174 E |
| 913360 | 6/1954 | Fed. Rep. of Germany | 33/174 E |
| 1330404 | 9/1973 | United Kingdom | 33/203.15 |

Primary Examiner—Harry N. Haroian
Attorney, Agent, or Firm—Parkhurts & Oliff

[57] ABSTRACT

A method and an apparatus for measuring wheel alignment of motor vehicles, particularly, toe-in and the angle of camber, comprising at least a pair of measuring units. Each unit comprises a sensor plate having a semicircular configuration substantially corresponding to the upper half of the wheel to be measured. The sensor plate is brought into contact with the outer side face of one of a pair of front or rear wheels of a vehicle. The sensor detects the inclination of the sensor plate in the vertical level which is perpendicular to the floor surface on which the vehicle is placed. The sensor also detects the direction of the sensor plate in the horizontal level which is parallel to the floor surface. The angle of camber of the wheel is determined on the basis of the measured inclination of the sensor plate. The toe-in of the pair of wheels is determined on the basis of the measured directions of the sensor plates for the pair of wheels.

5 Claims, 11 Drawing Figures

METHOD AND AN APPARATUS FOR MEASURING WHEEL ALIGNMENT OF MOTOR VEHICLES

BACKGROUND OF THE INVENTION

This invention relates to a method and an apparatus for measuring the wheel and tire (hereinafter any reference to wheel means wheel and tire) alignment of motor vehicles, and more particularly relates to a method and an apparatus for measuring toe-in and/or camber of wheels of motor vehicles.

The measuring method and apparatus of the present invention can be effectively employed in an inspection line of a vehicle assembling or repairing factory, where toe-in and/or camber of wheels should be measured.

In this disclosure the term "toe-in" means toe-in or toe-out.

In the prior art, toe-in of wheels of a vehicle has been measured by using a dynamic toe tester. Front wheels are placed on the dynamic toe tester and rotated by a rotating drum, and the side force (i.e. the force by which the drum is moved in the transverse direction) of both the left and right wheels is measured. Then the valve of toe-in is determined by a calculating operation. However, according to the conventional method, it has been impossible to separate the left and right values of the toe-in with respect to the longitudinal center line of the vehicle. In other words, the horizontal directions of the front wheels with respect to the horizontal direction of the vehicle cannot be determined. Therefore, even if the value of toe-in is determined correctly, and the front wheels are situated for the straight forward direction, the steering wheel is often mounted at an inclined angle. In addition, in the case of a front engine and front drive vehicle, or a four wheel independent suspension type vehicle, toe-in of the rear wheels should be established. In the conventional art, no measuring apparatus has been found, by which apparatus toe-in of rear wheels is simultaneously measured with toe-in of front wheels.

An object of the present invention is to provide a method and an apparatus for measuring toe-in of vehicles, by which toe-in of front wheels and toe-in of rear wheels are simultaneously measured and the value of the toe-in can be divided into the right and the left with respect to the longitudinal center line of the vehicle.

Another object of the present invention is to provide a method and an apparatus for measuring, at the same time, toe-in and camber of a wheels of vehicle.

A further object of the present invention is to provide a method and an apparatus for accurately measuring toe-in and camber of wheels of a vehicle with a means having a simple construction.

According to an aspect of the essential features of the present invention, an apparatus for measuring the wheel alignment of motor vehicles comprises at least a pair of measuring units, each unit comprising a plate member, means for supporting and bringing said plate member in contact with the outer side face of one of a pair of front or rear wheels of a vehicle, and sensor means for detecting the inclination of said plate member in the vertical level, which is perpendicular to the floor surface on which said vehicle is placed, and/or detecting the direction of said plate member in the horizontal level, which is parallel to said floor surface.

According to another aspect of the essential features of the present invention, a method for measuring the wheel alignment of motor vehicles comprises the steps of: bringing at least a pair of sensor plates into contact with the outer side face of a pair of wheels, respectively, detecting the inclination of said plate members in a predetermined vertical level and/or detecting the direction of said plate members in a predetermined horizontal level, and determining toe-in and/or the angle of camber of the wheel or wheels.

DETAILED DISCRIPTION OF PREFERRED EMBODIMENTS

Figure 1:
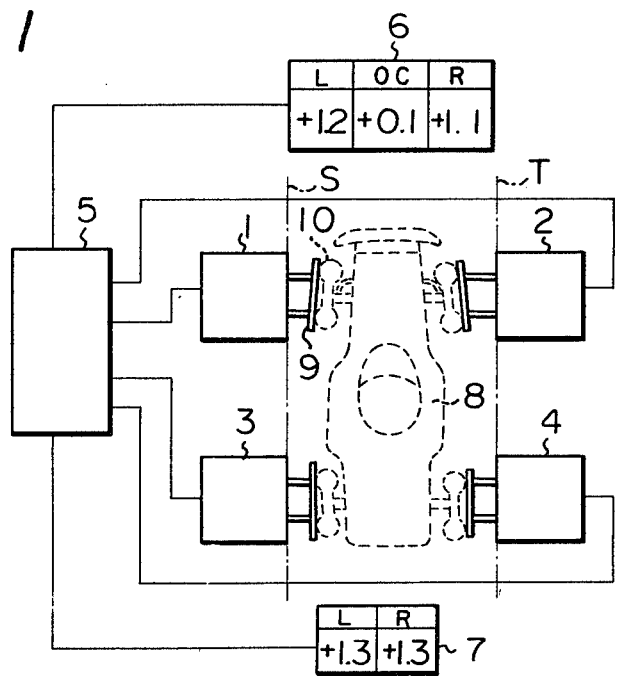
FIG. 1 is a schematic plan view illustrating an apparatus for measuring wheel alignment, particularly, toe-in of motor vehicles according to the present invention.

Referring now to FIG. 1, there is disclosed an apparatus for measuring wheel alignment, particularly, the toe-in of wheels of motor vehicles. There are four toe-in measuring units 1, 2, 3 and 4, each of which has a basic vertical surface S, T. The units 1 and 3 have the common surface S and the units 2 and 4 have the common surface T. A sensor plate 9, which is projected from each toe-in measuring unit, is brought into contact with the side face of each wheel 10 of a motor vehicle so that the horizontal direction of each wheel can be measured as the horizontal direction of the sensor plate 9. Consequently, the horizontal angle of a wheel with respect the longitudinal direction of the vehicle can be determined as tan. $\theta$ with respect to the predetermined vertical surface S or T. The predetermined vertical surfaces S and T are parallel with respect to each other. The results obtained by measuring are subjected to an operation as described hereinafter and the value of toe-in is indicated on board sections 6 and 7. In the board section 7, L designates the value of toe-in of the left side rear wheel and R designates the value of toe-in of the right side rear wheel. In the board section 6, L designates the value of toe-in of the left side front wheel, R designates the value of toe-in of the right side front wheel, and OC designates the value of OFF-CENTER. The value of OFF-CENTER means the difference between the value of toe-in of the left side front wheel and the value of toe-in of the right side front wheel. These operations are carried out in a computer 5.

Figure 2:
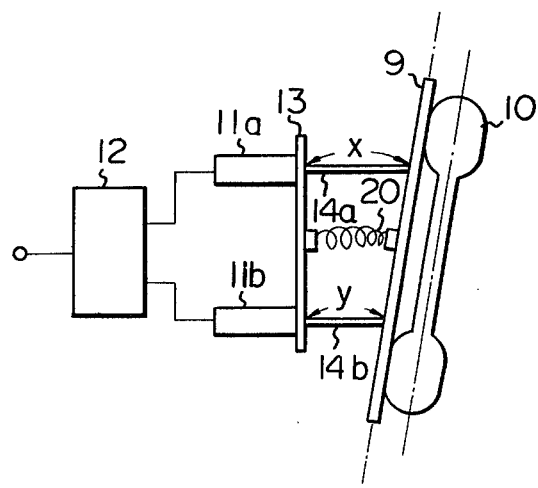
FIGS. 2 through 4 are schematic plan views illustrating respective embodiments of a toe-in measuring unit used in the apparatus shown in FIG. 1.
Figure 3:
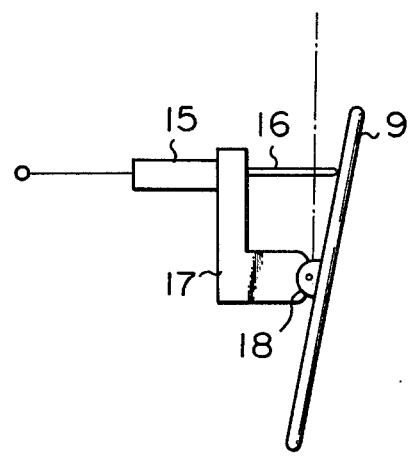
Figure 4:
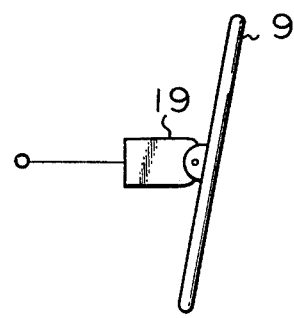
Figure 5:
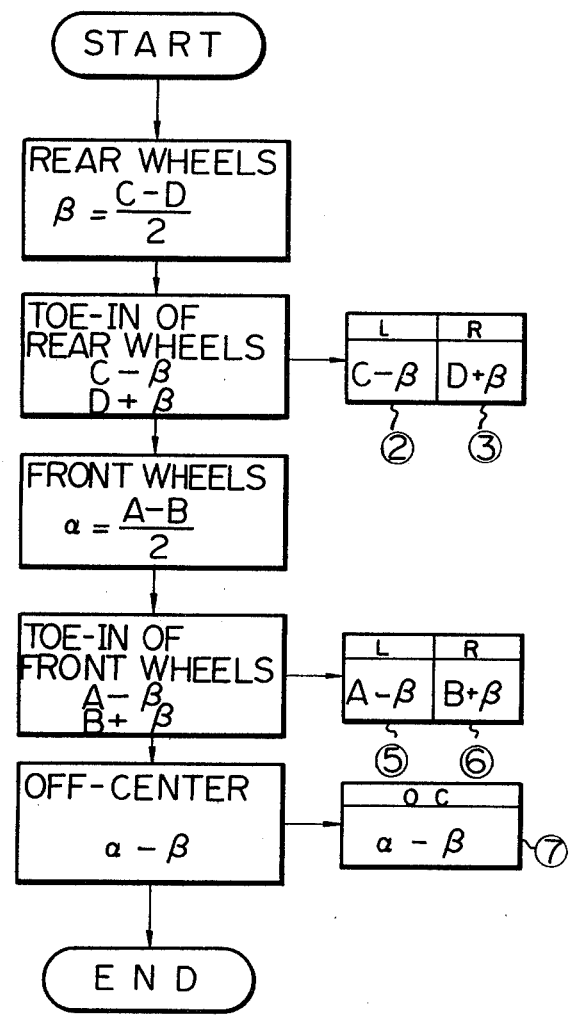
FIG. 5 is a block diagram illustrating a flow of operation in a computer used in the apparatus shown in FIG. 1.

In FIGS. 2 through 4, various embodiments of toe-in mesuring units 1, 2, 3 and 4, as described with reference to FIG. 1, are illustrated. The sensor plate 9 is gently brought into touch with the side face of the wheel 10 (FIG. 2) so that the sensor plate 9 follows the same direction as the wheel 10. In the embodiment illustrated in FIG. 2, sensor rods 14a and 14b project from sensor bodies 11a and 11b (for example, magnetic scales), respectively, which are mounted on a stationary sensor stay 13, and are brought into contact with the sensor plate 9. Then, the lengths of the respective sensor rods 14a and 14b are measured and the difference X-Y is determined in a difference calculation unit 12. The sensor plate 9 is secured to the sensor stay 13 by means of a balance spring 20 so that the sensor plate 9 can be gently brought into touch with the side face of the wheel 10. In the embodiment illustrated in FIG. 3, a sensor plate 9 is pivotally mounted on a L-shaped sensor stay 17 by means of a pivot member 18, and a sensor rod 16 projects from a sensor body 15 and is brought into contact with the sensor plate 9. The direction of a wheel in the horizontal plane can be determined by measuring the length of the sensor rod 16 projecting from the sensor body 15. In the embodiment illustrated in FIG. 4, the direction of a wheel in the horizontal plane, that is to say, the direction of sensor plate 9, can be directly measured by an angle detection sensor 19. The horizontal direction of the sensor plate 9 thus measured is indicated as a positive value if the front end of the sensor plate 9 is directed inwardly with respect to the basic surface S or T, as mentioned hereinbefore, and is indicated as a negative value if the front end of the sensor plate 9 is directed outwardly with respect to the basic surface S or T. The operation carried in the computer 5 is shown in the flow diagram in FIG. 5. Here, the values determined in the toe-in measuring units 1, 2, 3 and 4 are presumed to be as follows.

| UNIT 1 | A | (the direction of the front left wheel: tan θ) |
| UNIT 2 | B | (the direction of the front right wheel: tan θ) |
| UNIT 3 | C | (the direction of the rear left wheel: tan θ) |
| UNIT 4 | D | (the direction of the rear right wheel: tan θ) |

First of all, the direction which can be determined by the two rear wheels is given as $\beta$ as follows:

$$\beta = \frac{C - D}{2} \quad (1)$$

The values of toe-in C and D of the rear wheels are then compensated with $\beta$ as follows:

Toe-in of the rear left wheel ... $C - \beta$    (2)

Toe-in of the rear right wheel ... $D + \beta$    (3)

In the same manner, the direction as determined by the two front wheels is given as $\alpha$, as follows:

$$\alpha = \frac{A - B}{2} \quad (4)$$

The values of toe-in A and B of the front wheels are then compensated with $\beta$ as follows:

Toe-in of the front left wheel ... $A - \beta$    (5)

Toe-in of the front right wheel ... $B + \beta$    (6)

The difference between the directions given by the front wheels and rear wheels is an important factor for adjusting the steering OFF-CENTER (that is to say, for adjusting the steering wheel so as to be correctly mounted on a vehicle body at the center position thereof with respect to the straight forward direction of the vehicle). The difference thus determined can be presumed as a value of OFF-CENTER.

The value of OFF-CENTER (O·C) ... $\alpha - \beta$    (7)

The values (2), (3), (4), (5), (6) and (7) mentioned above are indicated respectively, by numerals. That is to say, in the board section 7 (FIG. 1) the values (2) and (3) are indicated and in the board section 6 the values (5), (6) and (7) are indicated. The information thus determined as referred to (2) through (7) is processed as follows.

In the case of adjusting the toe-in of rear wheels in a front engine and front drive type vehicle or a four wheel independent suspension type vehicle, the values of toe-in (2) and (3) should be used. In various kinds of vehicles, when a steering wheel is mounted on a steering column, toe-in of the left and right front wheels is adjusted with the values of toe-in (5) and (6), and the steering wheel is correctly mounted at the center position thereof with respect to the straight forward direction of the vehicle, if the steering wheel is mounted at the position where the value of (7) is zero.

Figure 6:
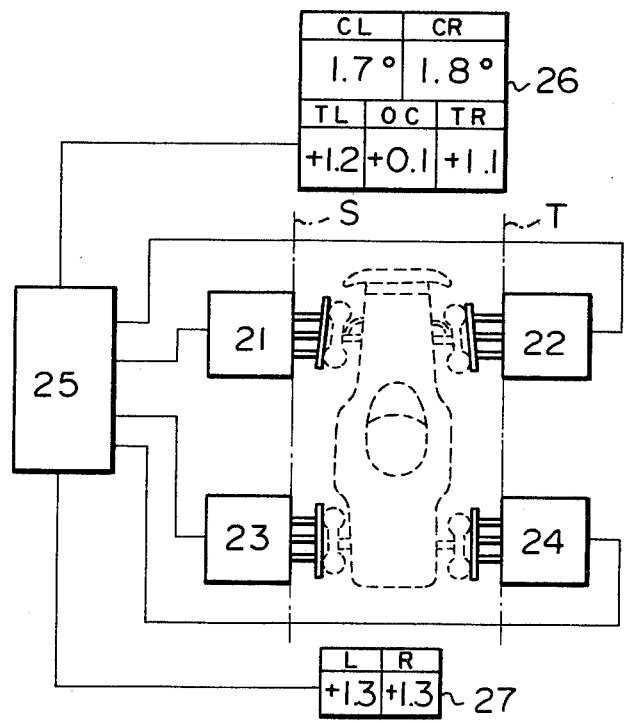
FIG. 6 is a schematic plan view illustrating an apparatus for measuring wheel alignment, particularly, toe-in and camber of wheels of motor vehicles according to the present invention.

Referring now to FIG. 6, there is disclosed an apparatus for measuring wheel alignment, particularly, toe-in and camber of wheels of motor vehicles. There are four measuring units 21, 22, 23 and 24, each of which has a basic vertical surface S or T. The units 21 and 23 have the common surface S and the units 22 and 24 have the common surface T. These surfaces S and T are perpendicular to the floor and parallel to each other. These units 21, 22, 23 and 24 are connected to a computer 25, via cables. A board section 26 and a board section 27 are also provided for indicating the data concerning the front wheels and rear wheels, respectively. In the board section 26, CL and CR designate the angles of camber of the left side and the right side front wheels, respectively, TL and TR designate the values of toe-in of the left side and the right side front wheels, respectively, and OC designates the value of OFF-CENTER of the left and right front wheels. In the board section 27, L and R designate the values of toe-in of the left side and the right side rear wheels.

Figure 7:
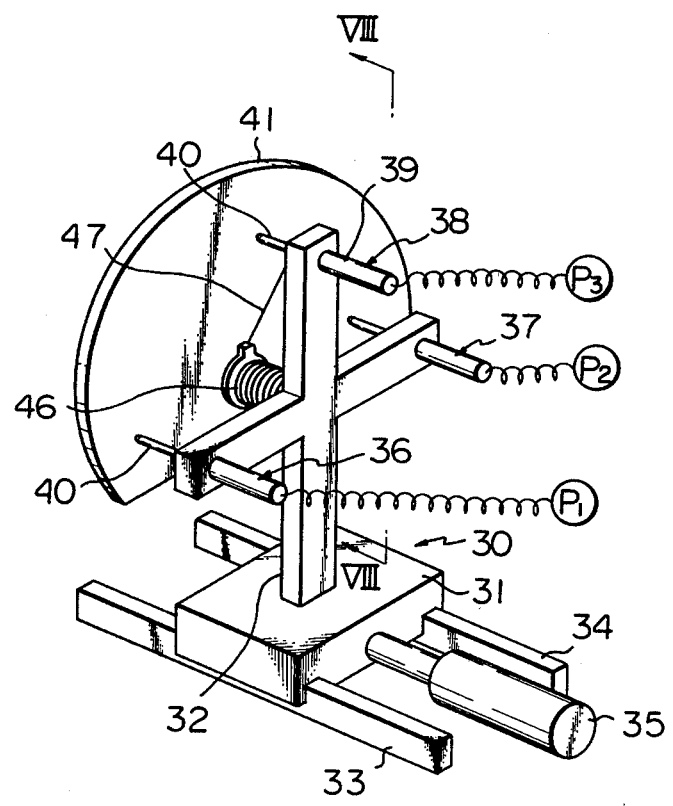
FIG. 7 is a perspective view illustrating a toe-in and camber measuring unit used in the apparatus shown in FIG. 6.

In the case of a front engine and front drive type vehicle or a four wheel independent suspension type vehicle, and if it is desired to measure the angles of camber of the rear wheels, the board section 27 for rear wheels can be constructed in the same manner as the board section 26 for front wheels. FIG. 7 is a perspective view illustrating one of the measuring units 21, 22, 23 and 24. The measuring unit has a movable support assembly 30 which can be moved along the direction perpendicular to the vertical basic surface S or T. The movable support assembly 30 comprises a movable pedestal 31 and a cross-shaped support 32 rigidly mounted on the pedestal 31, which is arranged to be movable along a pair of parallel rails 33, 34 which are arranged on the floor surface perpendicularly to the vertical basic surface S or T. The movable pedestal 31 is connected to one end of a hydraulic cylinder 35, the other end of which is rigidly connected to the floor. The hydraulic cylinder 35 is connected through a suitable oil pipe (not shown) to a hydraulic pump (not shown) which is actuated by the computer 25 (FIG. 6). As clearly seen from FIG. 7, the three measuring elements 36, 37 and 38 are mounted on both the left and right side ends and the top end, respectively, of the cross-shaped support member 32. The measuring elements 36 and 37 are placed at the same horizontal level and the measuring unit 38 is placed at the top point of an isosceles triangle which is defined by the bottom two points on which the measuring elements 36 and 37 are located. Each measuring element comprises a body 39 and a rod member 40 which projects away from the body 39 with the help of a spring (not shown) and may output an electrical signal which should correspond to the dimension by which the rod member 40 projects from the body 39.

A sensor plate 41 is made of a substantially semi-circular flat plate which is slightly smaller than the outer diameter of a vehicle wheel to be measured. Although the vehicle wheel is transversely expanded at the bottom portion thereof by the weight of the vehicle, the sensor plate 41 can be brought into contact with the side face of the wheel and can be positioned parallel to the central diametrical section of the wheel, because the sensor plate 41 is cut off at the lower portion thereof to be substantially semi-circular in shape and the diameter thereof in slightly smaller than the diameter of the wheel to be measured.

Figure 8:
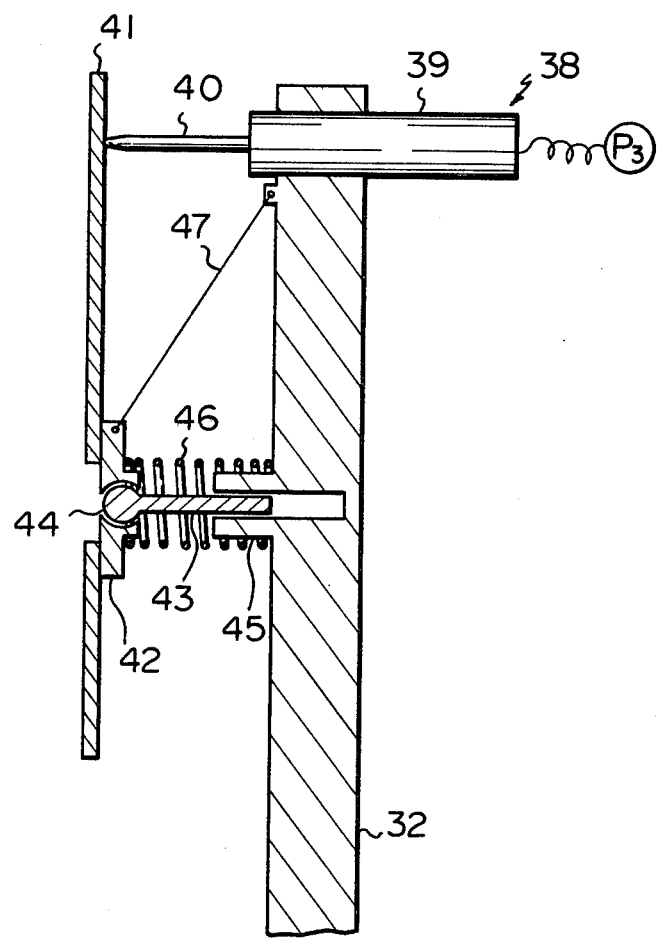
FIG. 8 is a cross-sectional view taken along line VIII—VIII in FIG. 7.

As shown in FIG. 8, retaining member 42 is rigidly secured to the sensor plate 41 at the central portion of the latter, which member 42 retains a ball portion 44 formed at one end of a connecting rod 43, the other end of which is freely inserted into a cylindrical bore 45 formed in the cross-shaped support 32. Between the retaining member 42 and the cross-shaped support 32 a coil spring 46 is disposed. Between the top portion of the cross-shaped support 32 and the retaining member 42 a wire 47 is provided so that the retaining member 42 is easily moved around the ball portion 44 and the connecting rod 43 is easily slidable in the cylindrical bore 45 to prevent the connecting rod 43 from slipping off from the cylindrical bore 45.

Figure 9:
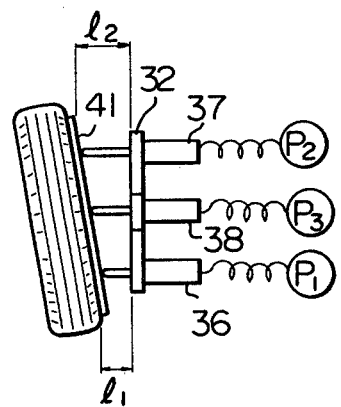
FIG. 9 is a schematic plan view of the unit shown in FIG. 7 to measure toe-in of a wheel.
Figure 10:
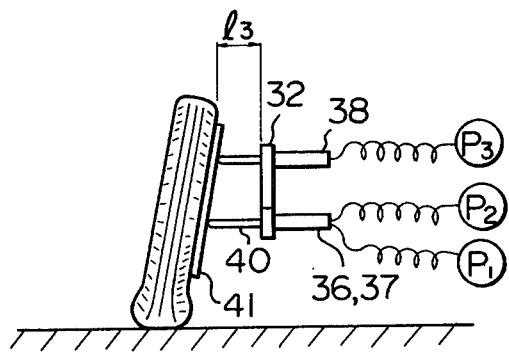
FIG. 10 is a schematic elevational view of the unit shown in FIG. 7 to measure camber of a wheel; and, FIG. 11 is a block diagram illustrating an operation carried in a computer used in the apparatus shown in FIG. 6.

In FIG. 6, a motor vehicle to be measured is placed in the measuring section so that the longitudinal direction of the vehicle is parallel to the vertical basic surfaces S and T and the respective wheels are placed opposite to the corresponding measuring units. After the vehicle is placed in position, the apparatus is switched on so that the hydraulic pump (not shown) starts into operation. In accordance with the actuation of the hydraulic pump, the hydraulic cylinder 35 (FIG. 7) is extended to move the support assembly 30 along the rails 33 and 34. Consequently, the sensor plate 41 carried by the support assembly 30 is brought into contact with the wheel (FIGS. 6, 9 and 10). The support assembly 30 is further moved forward by the hydraulic cylinder 35 and the distance between the sensor plate 41 and the support assembly 30 is gradually decreased. The distances $l_1$, $l_2$ and $l_3$ (FIGS. 9 and 10) between the support 32 and the sensor plate 41 at the positions of the measuring elements 36, 37 and 38, respectively, should be the same as the extension of probes in the respective measuring elements 36, 37 and 38, which output respective output signals $P_1$, $P_2$ and $P_3$ corresponding to the distances $l_1$, $l_2$ and $l_3$. In the computer 25 (FIG. 6), the mean output value $$\frac{P_1 + P_2}{2}$$

of the measuring elements 36 and 37 is compared with a predetermined value. When the mean output value is the same as or larger than the predetermined value, hydraulic supply to the hydraulic cylinder 35 is cut off to stop the forward movement of the support assembly 30. Therefore, the sensor plate 41 will be in contact with the wheel with a slight predetermined pressure and provides a basic measuring surface which is parallel to the wheel to be measured.

As illustrated in FIG. 9, toe-in of the wheel can be determined by measuring the direction of the sensor plate 41 in the horizontal level. That is to say, toe-in is determined as a function of the difference between the distances $l_1$ and $l_2$ ($l_2 - l_1$), and therefore can be determined from the difference of the output values $P_1$ and $P_2$ ($P_2 - P_1$). On the other hand, the angle of camber is determined by measuring the inclination of the sensor plate 41 in the vertical level, as illustrated in FIG. 10. As the angle of camber is defined as a function of $$\frac{l_1 + l_2}{2} - l_3,$$

it can be determined from an expression of $$\frac{P_1 + P_2}{2} - P_3.$$

In FIGS. 9 and 10, toe-in and the angle of camber of the wheel are exaggeratedly illustrated for the purpose of making the explanation easy.

Figure 11:
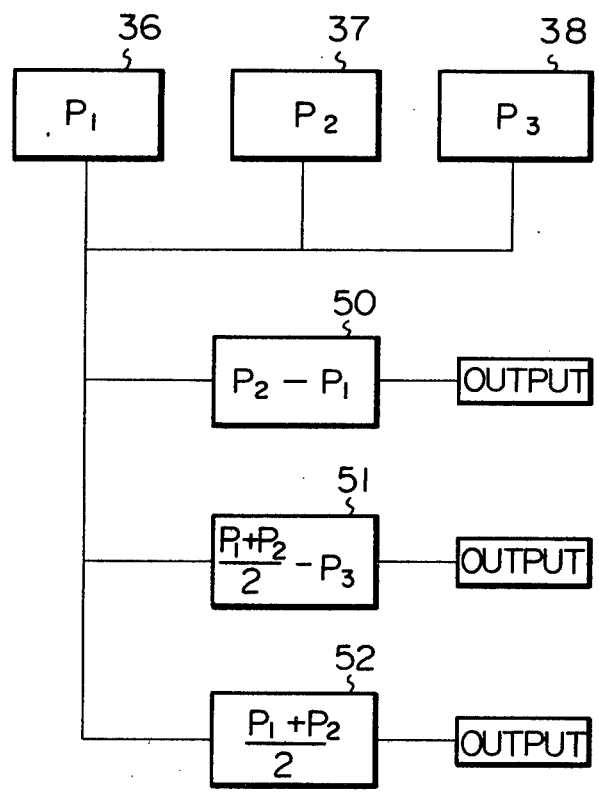

FIG. 11 is a block diagram of the computer process. The outputs $P_1$, $P_2$ and $P_3$ of the respective measuring elements 36, 37 and 38 are input into operating sections 50, 51 and 52. The first section 50 operates $P_p - P_1$ and outputs a voltage corresponding to the measured value of toe-in of the wheel in order to display it. The second section 51 operates $$\frac{P_1 + P_2}{2} - P_3$$

and outputs a voltage corresponding to the measured angle of camber of the wheel in order to display it. The third section 52 is a comparator which compares $$\frac{P_1 + P_2}{2}$$

with the predetermined value to obtain an output for controlling the above-mentioned hydraulic pump (not shown). The output signals from the sections 50 and 51 are transmitted to the board sections 26 and 27 (FIG. 6) where the measured toe-in and the angle of camber are indicated.

I claim:

1. An apparatus for measuring wheel alignment of motor vehicles, comprising a sensor plate member adapted to contact an outer side face of a rubber wheel tire bearing the weight of said motor vehicle, said sensor plate member being pivotably supported at about the central portion thereof by a stay member, means for supporting and bringing said sensor plate member in contact with said outer side face of the rubber wheel tire of one of a pair of front or rear wheels of said vehicle, and sensor means for detecting the direction of said sensor plate member in the horizontal level which is parallel to said floor surface on which said vehicle is placed, said sensor means including a sensor rod extending horizontally from said stay member to said sensor plate member to measure the direction of said sensor plate member in the horizontal level.

2. An apparatus for measuring wheel alignment of motor vehicles, comprising at least a pair of measuring units, each unit comprising a sensor plate member adapted to contact an outer side face of a rubber wheel tire bearing the weight of said motor vehicle, means for supporting and bringing said sensor plate member in contact with said outer side face of the rubber wheel tire of one of a pair of front or rear wheels of said vehicle, and sensor means for detecting the direction of said sensor plate member in the horizontal level which is parallel to said floor surface on which said vehicle is placed, said sensor plate being pivotably supported about the central portion thereof by an angle detection sensor element in which the direction of said sensor plate in the horizontal level is measured.

3. An apparatus as set forth in claim 1, wherein said sensor plate member is pivotably supported at about the central portion thereof and also is resiliently supported by said support member through spring means, and said support member is moved by a hydraulic cylinder so that said sensor plate member contacts with said wheel with a predetermined pressure.

4. An apparatus for measuring wheel alignment of motor vehicles, comprising at least a pair of measuring units, each unit comprising a flat sensor plate member, said sensor plate member being resiliently supported by a support member which is movable toward said wheel so that said sensor plate member is brought into contact with the outer side face of one of a pair of front or rear wheels of a vehicle, said support member carrying at least three measuring elements which detect the distances from a predetermined vertical basic surface to said sensor plate member, at both the side portions and the top portion of the latter, respectively, said predetermined vertical basic surface being perpendicular to a floor surface on which said vehicle is placed, thereby the vertical inclination of said sensor plate member and the horizontal direction of said sensor plate member can be determined on the basis of said distances.

5. An apparatus as set forth in claim 4, further comprising means for indicating, in numerals, said vertical inclination and said horizontal direction of said wheels.

* * * * *